No. 800,612. PATENTED SEPT. 26, 1905.
S. W. FINCH.
BOLT.
APPLICATION FILED APR. 18, 1905.
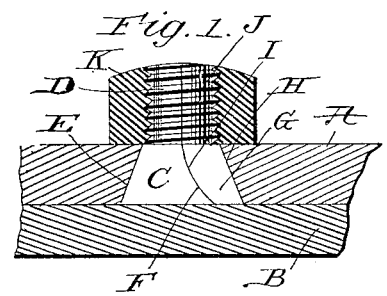
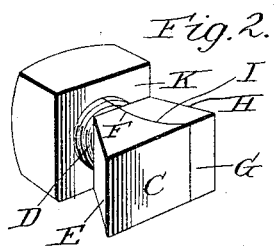
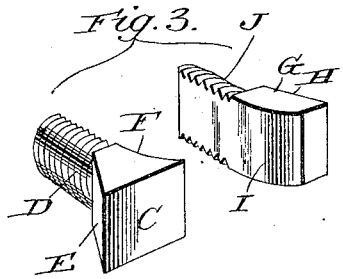
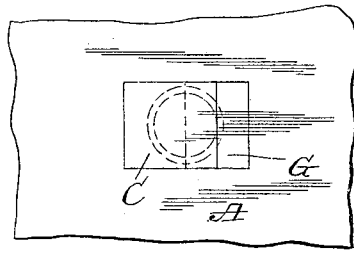
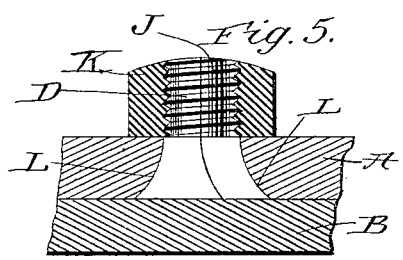
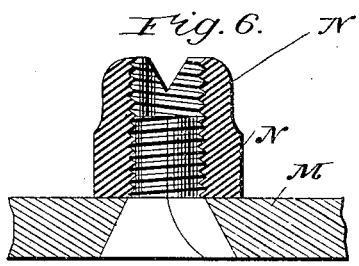
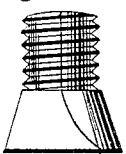
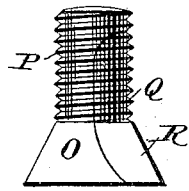
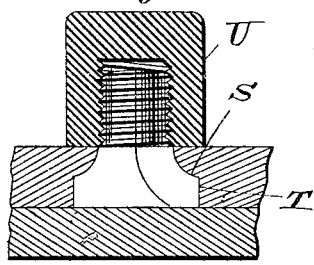
Witnesses
Inventor:
Stanley W. Finch,
By Dodge and Sons
Attorneys.

UNITED STATES PATENT OFFICE.

STANLEY W. FINCH, OF WASHINGTON, DISTRICT OF COLUMBIA.

BOLT.

No. 800,612.  Specification of Letters Patent.  Patented Sept. 26, 1905.

Application filed April 18, 1905. Serial No. 256,272.

*To all whom it may concern:*

Be it known that I, STANLEY W. FINCH, a citizen of the United States, residing at Washington, in the District of Columbia, have invented certain new and useful Improvements in Bolts, of which the following is a specification.

My present invention pertains to improvements in bolts, the construction and advantages of which will be hereinafter set forth, reference being had to the annexed drawings, wherein—

Figure 1 is a side elevation of the bolt, the plates and nut being shown in section; Fig. 2, a perspective view of the bolt and nut; Fig. 3, a similar view of the two parts of the bolt; Fig. 4, a face view of a plate with the bolt therein; Fig. 5, a view similar to Fig. 1, showing a slightly-modified form of bolt; Fig. 6, a like view illustrating the use of the device in conjunction with a nut of special form; Fig. 7, a side elevation of a still further modification of the bolt; Fig. 8, a top plan view of said bolt; Fig. 9, a side elevation of a further modification, and Fig. 10 a sectional elevation of a slightly-modified form of bolt and nut.

The object of my invention is to construct a two-part bolt in such manner that it may readily be inserted into a tapered opening formed in a plate or the like through the smaller orifice or entrance thereto, the head of the bolt when so entered having a fair bearing upon all the walls of the opening (with the possible exception of the bottom) and entirely filling the space in cross-area for the entire depth of the bolt-head. In case the bolt-head is of a length equal to the depth of the opening, as in practice it is designed it should be, the entire space or opening is filled. When the nut is secured upon the stem of the bolt, separation of the parts is absolutely precluded and it becomes impossible to remove the bolt from the opening. By having the head extend from wall to wall of the tapered opening and leaving no space between the abutting parts there is no chance for the parts to bend; but, on the other hand, they serve to mutually sustain and brace each other.

Referring first to the construction illustrated in Figs. 1 to 4, inclusive, A and B denote the members of a composite plate to which it is desired to secure a bolt. Plate A is provided or formed with an opening for the reception of the bolt-head, two opposite walls of the opening being inclined toward each other, while the other two are vertically disposed. The bolt comprises two parts, one portion having a major head-section C and a stem D. Head C is formed with an inclined outer face E and with a curved face or seat F. The other or locking section of the bolt likewise has a head G, formed with a beveled or inclined outer face H and with a curved inner face I, said face being complemental in form to the curved face F of the other section. The stem J of the second section, together with stem D, forms a complete threaded stem for the reception of the nut K when the parts are assembled. As will be observed, the widest portion of head G in the construction shown in the figures referred to above is at its point of junction with its stem. This enables the locking portion G of the bolt-head to be passed into the opening after the major head portion has been inserted and moved to one side thereof. By forming the head portions with complemental curved faces section G may be readily placed in position, the outer inclined face making a fair and full bearing against the correspondingly-inclined face or wall of the opening.

In Fig. 5 a slight modification in the form of the bolt-head is shown. Instead of making the outer inclined faces of the bolt-head upon straight lines I propose to curve the same, as shown at L in said figure. The line of division between the two parts of the bolt is curved, as in the former construction, the locking portion of the bolt-head being of the same thickness throughout—that is to say, the line of division and the line of curvature of the outer face are parallel. In the use of this construction the recess into which the bolt-head is fitted must of course be curved to conform to the curvature of the inclined faces of the head in order that it may completely fill the opening.

In Fig. 6 the bolt is shown as applied to a single thickness of metal M, which may be said to represent a portion of a horseshoe, in which case the bolt will be fitted with a nut of special form, as N in Fig. 6 or U in Fig. 10, which serves as a calk. As will be readily appreciated, the bolt with the calk-nut may be applied to a horseshoe without removing the shoe from the hoof of the animal.

In Figs. 7 and 8 a further modification of the invention is shown. In this construction the completed bolt-head is elliptical in cross-section instead of polygonal or rectangular.

In Fig. 9 a still further modification of the invention is illustrated, wherein the major portion of the head O is provided with a stem P, the outer end of which is of the full diameter of the completed stem. Said portion O is cut away or provided with a curved seat or recess adapted and designed to receive the stem Q of the locking portion R of the bolthead. With this construction it may be simpler to start the nut upon the bolt than in the forms in which the line of division extends to the end of the stem.

Another modification of the bolt is shown in Fig. 10, in which each section of the head instead of having an inclined face, which extends from the stem to the base or outer end or edge of the head, is shown as provided with a curved face S and a straight face T, the latter being parallel, or substantially so, with the axis of the stem of the bolt. The opening into which the head is to be fitted must of course be shaped to correspond thereto. The line of division between the two members is formed upon a curve and, as in the construction shown in Fig. 5, the curved faces of the wedging and locking member of the head are in parallelism. In Fig. 10 is also shown a modified style of nut U, which may be partially or entirely polygonal in form.

The advantages of a bolt of the character herein shown and described are manifest. As just noted, it presents a simple and ready means of forming a detachable or removable calk for horseshoes. It also affords a simple means for attaching a device to a plate which must be cut from the side upon which the device is to be secured. Situations often arise in which it is found to be impossible to bore through a plate, either for the reason that one side is not accessible or it is not desirable to make an opening entirely through the plate, in which event a bolt of this character may be readily used. It is of course a comparatively simple operation to form a hole which will receive a bolt-head such as is herein shown.

I am aware that two-part bolts, broadly considered, are not new; but I am not aware that such a bolt has ever been constructed in which the head will completely fill the opening (in cross-area, at least) into which it is inserted, the parts at all times remaining in close contact with each other throughout and the bolt being so constructed that it may be inserted into the opening from either side.

Having thus described my invention, what I claim is—

1. A bolt comprising two members, one of said members having a stem portion and a head portion, the inner face of said head portion being inclined toward the other member of the bolt, and the other member likewise having a stem and a head portion the inner face of which is inclined away from the other member of the bolt.

2. A longitudinally-bisected bolt, the line of bisection of the head being formed upon a curve extending from the stem outwardly toward one side of the head.

3. A bevel-headed longitudinally-bisected bolt, the line of bisection of the head being formed upon a curve extending from the stem outwardly toward one side of the head.

4. A longitudinally-bisected bolt, the line of bisection being inclined toward one side of the head of the bolt and terminating at a point below the end of the stem.

5. A bolt comprising two parts adapted to form a complete bolt, one of said parts having a wedge-shaped head with a curved face, the second portion having a head-section provided with a complemental curved face, which portion when placed in position acts as a key or wedge to lock the bolt as a whole in place.

6. A bolt having two longitudinal sections, one of which sections has a substantially wedge-shaped head that comprises more than one-half of the entire head of the bolt.

7. A bolt having two longitudinal sections, one of which sections has a substantially wedge-shaped head that comprises more than one-half of the entire head of the bolt, and the other of which sections has its corresponding end so shaped that its inner surface is complemental to the inner surface of the wedge-shaped head of the other section.

In testimony whereof I have signed my name to this specification in the presence of two subscribing witnesses.

STANLEY W. FINCH.

Witnesses:
   CHAS. J. ALLISON,
   THOS. B. MORTON.